(12) United States Patent
Mann et al.

(10) Patent No.: US 6,212,165 B1
(45) Date of Patent: Apr. 3, 2001

(54) APPARATUS FOR AND METHOD OF ALLOCATING A SHARED RESOURCE AMONG MULTIPLE PORTS

(75) Inventors: Eytan Mann, Modiin; Yoav Honig, Ramat Gan, both of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/047,066

(22) Filed: Mar. 24, 1998

(51) Int. Cl.[7] .............................. G06F 13/22; H04J 3/12
(52) U.S. Cl. .................... 370/231; 370/235; 370/415; 710/220
(58) Field of Search .................... 370/230, 231, 370/235, 412, 428, 503, 336, 455, 452, 415, 416; 710/220

(56) References Cited

U.S. PATENT DOCUMENTS

| | | | |
|---|---|---|---|
| 4,672,536 | 6/1987 | Giroir et al. | 364/200 |
| 5,274,644 | * 12/1993 | Berger et al. | 370/230 |
| 5,293,486 | * 3/1994 | Jordan et al. | 710/220 |
| 5,446,737 | * 8/1995 | Cidon et al. | 370/452 |
| 5,491,694 | * 2/1996 | Oliver et al. | 370/455 |
| 5,719,854 | * 2/1998 | Choudhury et al. | 370/231 |
| 6,021,124 | * 2/2000 | Haartsen | 370/336 |
| 6,075,772 | * 6/2000 | Brown et al. | 370/235 |

* cited by examiner

*Primary Examiner*—Alpus H. Hsu
*Assistant Examiner*—Afsar M. Qureshi
(74) *Attorney, Agent, or Firm*—Howard Zaretsley; David J. Weitz; Wilson Sonsini Goodrich & Rosati

(57) ABSTRACT

An apparatus for and a method of collapsing multiple ports to a single queue. The invention has applications in switching devices whereby several external ports share the same resource, such as a switching fabric. In order to allocate the resources fairly to all the ports, a scanning method is used to allocate the division of the resources to each of the external ports. A port combiner circuit continuously scans or polls the external ports in a round robin fashion checking for a port ready to input data. An external port in a ready state transfers its frame data to an input queue. The frame data is written to the next available segment in the input queue which is comprised of RAM configured as a circular buffer. After a frame is written, the write pointer is incremented to point to point to the next available segment. The next frame segment read out of the input queue is always the first one written. The queue thus formed received multiple inputs but has a single output. The scanning method is operative to pass input frames to the shared resource, i.e., the switching fabric, in accordance with their arrival order and without regard to the source port the frame came in on.

25 Claims, 4 Drawing Sheets

APPARATUS FOR AND METHOD OF ALLOCATING A SHARED RESOURCE AMONG MULTIPLE PORTS

FIELD OF THE INVENTION

The present invention relates generally to data communication systems and more particularly relates to an apparatus for and a method of collapsing multiple ports to a single queue in a switching device.

BACKGROUND OF THE INVENTION

Currently, data networks are experiencing tremendous growth in both business and consumer areas. Corporate use of data networks is growing at a furious rate while at the same time more and more consumers are staking out their place in cyberspace. Corporations are realizing the utility and importance of maintaining an up to date, fast and reliable network. To that end, network equipment manufacturers are constantly striving to improve their current offerings of equipment, e.g., hubs, switches, routers, bridges, multiplexors, etc.

In connection with switch design, the architecture of the typical prior art switch, generally referenced 20, is as shown in FIG. 1. A plurality of ports 12 pass input data, e.g., frames, to their associated queues 14 which are of a finite size. The ports represent the link layer components, i.e., the MAC layer. Each queue 14 is of the first in first out (FIFO) type. Four ports and queues are shown for illustrative purposes only. The output of each queue 14 is input to a four input multiplexor 16. The output of the multiplexor 16 is input to the switching fabric 18. Note that a switching fabric is shown for illustrative purposes only. The switching fabric can be replaced with any other type of resource that must be shared such as data buses, switch cores, processing cores, external ports, memory devices, etc. The output of the switching fabric 18 is input to an output demultiplexor 22 which demultiplexes the output of the switching fabric to the original four data paths. The output of the demultiplexor 22 is input to downstream processing elements (if any).

This scheme works fine when the bandwidth of the switching fabric is more than the combined bandwidth of the input ports 12. A problem arises when the bandwidth of the switching fabric is less than the combined bandwidth of the input ports 12. For example, a problem exists if the bandwidth of the switching fabric is 300 Mbps and each port is capable of clocking in data at 100 Mbps. In this case, the input multiplexor 16 uses a time division multiplexing (TDM) technique to time slice data from each input port. Thus, a round robin approach would be used to share the limited resources of the switching fabric. Using a round robin approach gives each input port equal priority. A disadvantage of this approach is that all ports 'suffer' equally with no priority being given to any port over another port. The problem is that a time slot is allocated to a port on a static basis regardless of whether the port has any data to input to the switching fabric. This approach is wasteful of bandwidth and leads to lower performance of the network device.

SUMMARY OF THE INVENTION

The present invention attempts to solve the problems associated with the prior art by providing an apparatus for and a method of collapsing multiple ports to a single queue. The invention has applications in switching devices, for example, whereby several external ports share the same resource, e.g., data buses, switching fabrics, etc. In order to allocate the resources to all the ports, a scanning method is used to allocate the division of the resources to the ports during each time slot. This scanning method is useful in cases where the bandwidth of the switch resources is less then the combined bandwidth of the external ports. In this case, a queue is required to be established and integrated into the scanning method. The present invention discloses such a scanning method whereby frames are passed to the shared resource, i.e., the switching fabric, in accordance with their arrival order and without regard to the source port the frame came in on.

There is provided in accordance with the present invention a method of allocating a shared resource among a plurality of external ports, the method comprising the steps of providing an input queue, the input queue divided into a plurality of segments each capable of holding a frame of data, scanning the plurality of external ports in a predetermined manner for data ready to be input, writing frame data from the plurality of external ports to the next free segment in the input queue wherein the order of writing frames to the segments is in accordance with their arrival over the plurality of external ports and reading frame data from the input queue to the shared resource wherein the order of reading frames is in accordance with their arrival over the plurality of external ports.

The step of writing comprises the step of maintaining a plurality of write pointers wherein each write pointer points to a segment of the input queue holding frame data or comprises the step of maintaining a write pointer which points to the next free segment within the input queue to be written to with frame data from an external port.

The step of reading comprises the step of maintaining a single read pointer which points to the next segment of frame data to be read to the shared resource. The steps of scanning, writing and reading are performed sufficiently quick enough to allocate the shared resource in the case when the bandwidth of the shared resource is less than the aggregate bandwidth of the plurality of external ports.

The method also comprises the step of queuing the frame data input from each external port before being written to the input queue. In addition, frame data from the plurality of external ports is written to the next free segment in the input queue without regard to the particular external port the frame originated on. Also, the step of scanning comprises scanning the plurality of external ports in a round robin fashion.

There is also provided in accordance with the present invention an apparatus for allocating a shared resource among a plurality of external ports, the apparatus comprising an input queue, the input queue divided into a plurality of segments each capable of holding a frame of data, scanning means for scanning the plurality of external ports in a predetermined manner for data ready to be input, write means for writing frame data from the plurality of external ports to the next free segment in the input queue wherein the order of writing frames to the segments is in accordance with their arrival over the plurality of external ports and read means for reading frame data from the input queue to the shared resource wherein the order of reading frames is in accordance with their arrival over the plurality of external ports.

The write means is adapted to write frame data from the plurality of external ports to the next free segment in the input queue without regard to the particular external port the frame originated on. The scanning means comprises means for scanning the plurality of external ports in a round robin fashion. The apparatus further comprises an output queue for receiving data from the shared resource directed to the plurality of external ports.

In addition, the input queue comprises random access memory (RAM) configured as a circular buffer thus creating a first in first out (FIFO) queue. The apparatus further comprises an input buffer for performing rate adaptation between the input queue and the shared resource. The apparatus further comprises an output buffer for performing rate adaptation between the output queue and the shared resource.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| FIFO | First In First Out |
| MAC | Media Access Control |
| MII | Media Independent Interface |
| RAM | Random Access Memory |
| TDM | Time Division Multiplexing |

General Description

Figure 1:
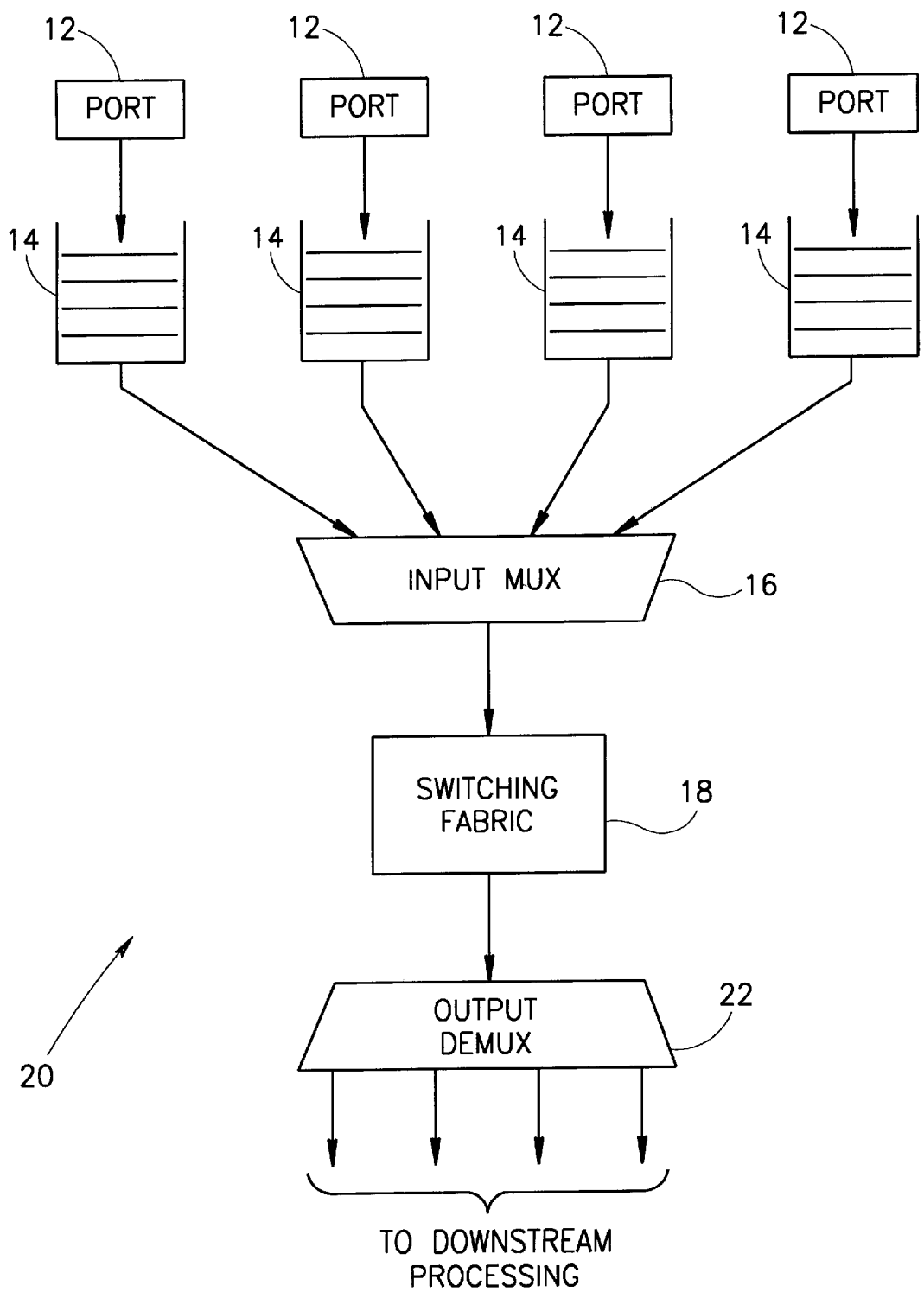
FIG. 1 is a block diagram illustrating a prior art example of a communications device wherein multiple ports and queues input data to a switching fabric via an input multiplexor.
Figure 2:
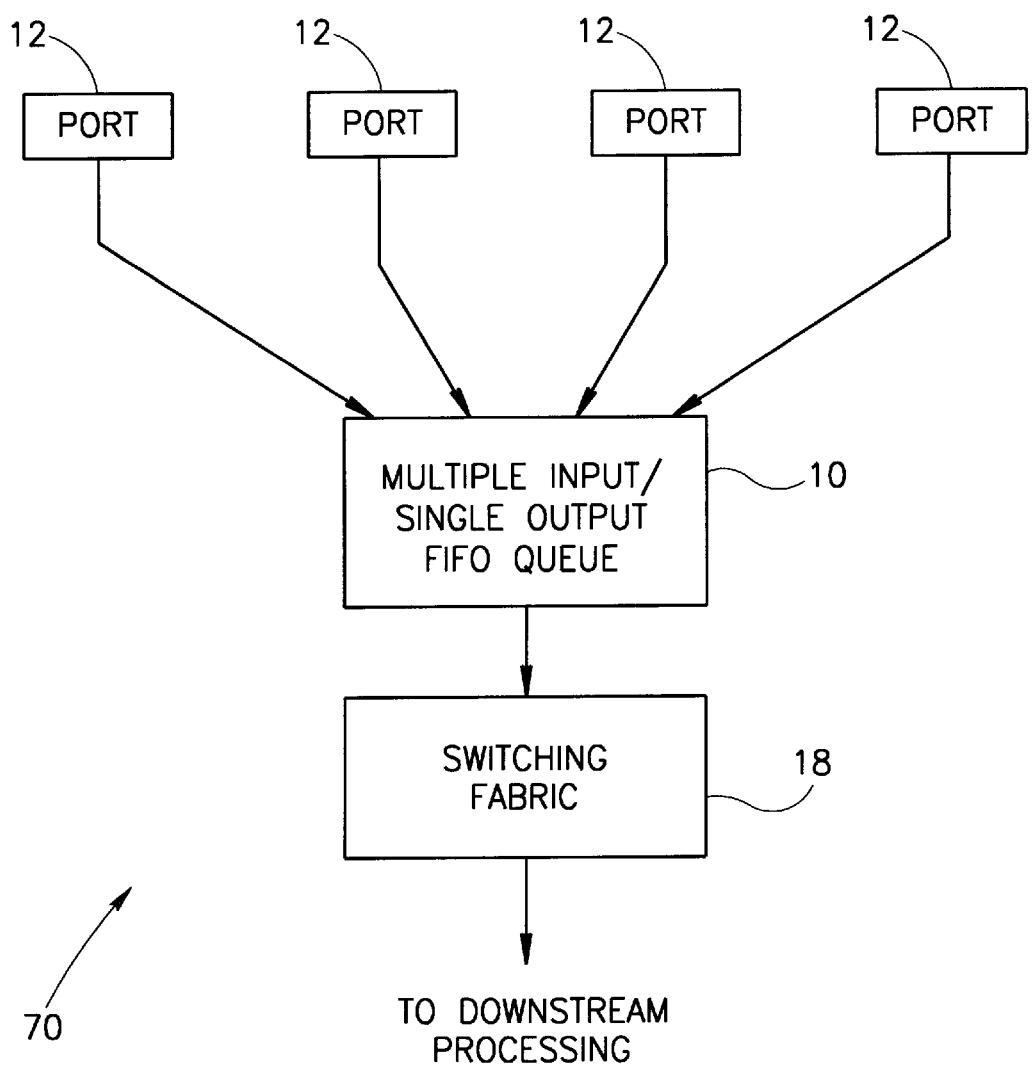
FIG. 2 is a block diagram illustrating a multiple input/single output FIFO queue of the present invention inputting data to a switching fabric.

A block diagram illustrating a multiple input/single output FIFO queue of the present invention coupled to a shared resource is shown in FIG. 2. The components shown in FIG. 2 may comprise a portion of data network device, such as a switch, generally referenced 70. A plurality of external ports 12 output data into a multiple input/single output FIFO queue 10. Four external ports are shown for illustration purposes only. The principles of the invention can be applied to switches having any arbitrary number of external ports. The output of the FIFO queue 10 is input to the shared resource which in the example shown in FIG. 2 is a switching fabric 18. The output of the switching fabric is input to downstream processing elements for possible further processing.

The principle of the scanning method of the present invention is to appropriately manage the queue FIFO 10. The input portions of the queue 10 must be able to support the combined bandwidth of all the external ports 12. This is so that heavy bursts of data traffic can be supported without any information being dropped. In addition, the identity of the port the data came in on is typically needed by the shared resource, i.e., the switching fabric 18. Thus, the port index or other form of port identification must escort the port frame data as it is written to the queue 10. Further, the output data rate of the queue 10 is preferably tuned to match the bandwidth of the shared resource 18.. In other words, in the example shown in FIG. 2, the output data rate of the queue FIFO 10 should be tuned to match the input data rate of the switching fabric 18.

Figure 3:
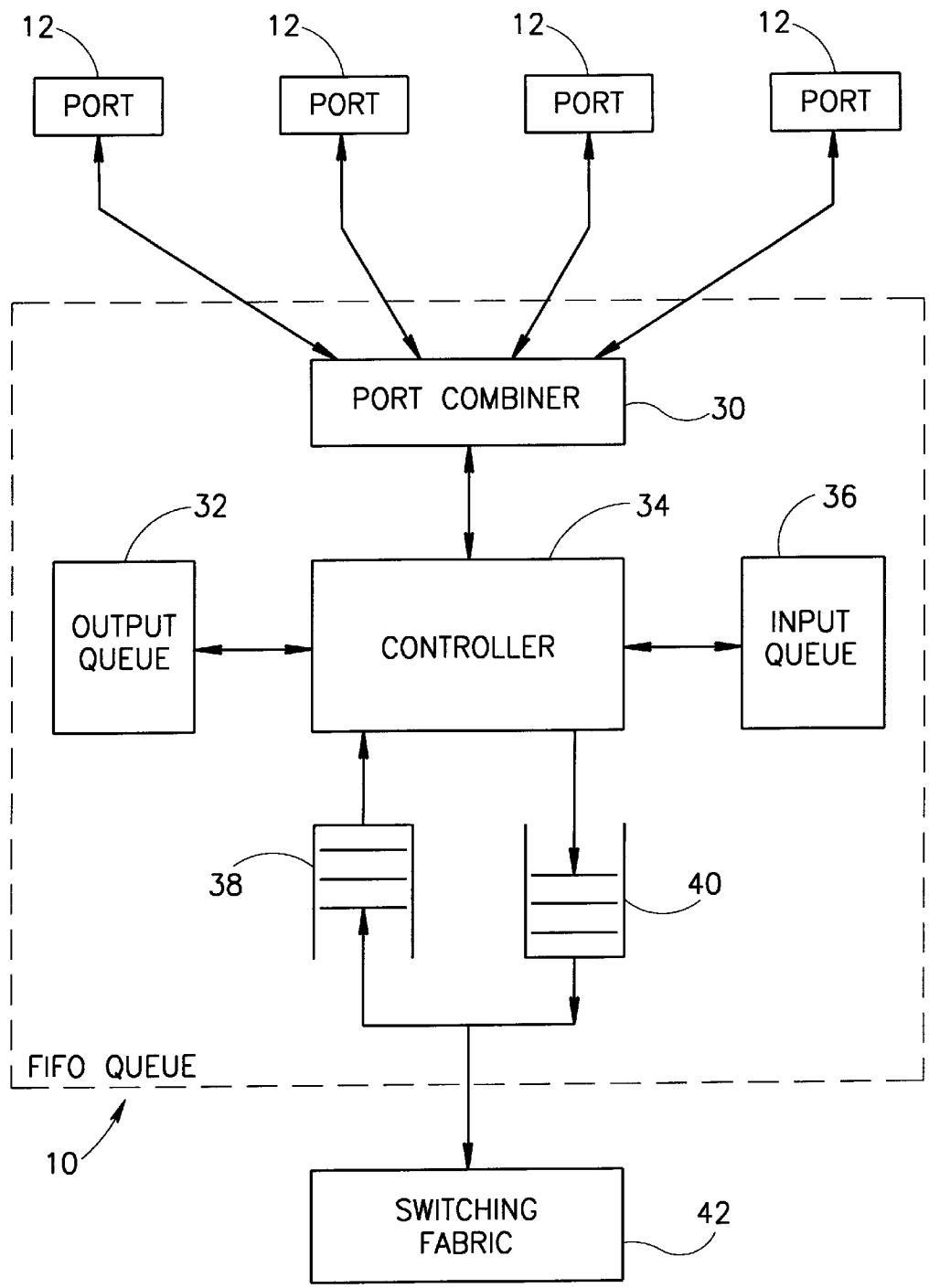
FIG. 3 is a block diagram illustrating the multiple input/single FIFO queue of the present invention in more detail.

A block diagram illustrating the multiple input/single FIFO queue of the present invention in more detail is shown in FIG. 3. The multiple input/single output FIFO queue 10 comprises a port combiner 30, controller 34, output queue 32, input queue 36, an output buffer 38 and an input buffer 40. The input and output buffers are coupled to the shared resource which in this example is the switching fabric 12.

The plurality of external ports 12 output data to a port combiner 30 using any suitable interface such as a media independent interface (MII). Rather than assign each external port a time slot as in the prior art TDM approach, the port combiner 30 continuously scans the external ports looking for a port with data ready to be input. Thus, switch bandwidth is not wasted on ports that do not have any data to transmit. The controller 34 provides control and administrative functions while also providing data paths for the data to and from the port combiner 30, output queue 32, input queue 36, output buffer 38 and input buffer 40. Note that for the case of Ethernet being used for the layer 2 protocol, the port combiner is adapted to be Ethernet frame aware, i.e., it can recognize the start and end of Ethernet frames.

Note that in FIG. 3, each double beaded arrow represents a bidirectional data path. In addition, the FIFO queue 10 is constructed to handle data in both directions, i.e., to and from the switching fabric. Thus, the FIFO queue comprises an input queue 36 and associated input buffer 40 for data directed from the external ports to the switching fabric 42 in addition to comprising an output buffer 38 and output queue 32 for data received from the switching fabric and directed towards the external ports.

Preferably, the input queue 36, input buffer 40, output queue 32 and output buffer 38 are constructed from random access memory (RAM). The RAM making up each queue and buffer is divided into segments, with each segment sufficiently large to hold one frame of data and its attribute. The size of a frame will vary with the layer two protocol used. For example, using Ethernet for the link layer protocol results in a segment no larger than approximately 1500 bytes.

In operation, the port combiner 30 functions to very rapidly scan in round robin fashion all the external ports 12 coupled to it. If an external port has data ready to input, the port combiner pumps the data from the port to the controller 34. The controller, in turn, writes the input data into the input queue 36. The frame data input from any of the external ports is always written to the next free segment in the input queue 36. Once the frame data is written, the index to the external port or other port identification code is also written into the segment along with the frame data. The first frame written into the input queue is always the first frame that is read out. The controller 34 manages the writing and reading of the input queue 36.

Once frame data is written to a segment in either the input or output queue, the write pointer is incremented to point to the next available empty segment. Likewise, when the frame data from a segment is read, the read pointer is incremented to point to the next segment to be read out. In this fashion, the RAM making up the input and output queues create a FIFO having multiple inputs and a single output.

The data read out of the output queue 36 is placed into the input buffer 40 by the controller 34. The input buffer performs rate adaptation to soak up any differences in the data rates between the input queue RAM 36 and the switching fabric 42. Likewise, in the reverse direction, the output buffer 38 performs rate adaptation to absorb any rate differences between the output queue RAM and the switching fabric 12.

Note that, preferably, the controller is capable of writing to more than four segments in the input queue 36, however, up to four segments can be written to at any one time. Thus, the controller functions to track five data streams, i.e., four data streams from the external ports and one data stream being read out to the switching fabric. It is important to note that even if segments within the input queue have completed being written to, the controller waits for the segment next in line to be read to finish writing. In this fashion, the same order in which data is received from the external ports is the same order in which the data is read from the input queue to the switching queue. In an alternative embodiment, the controller may be constructed with added complexity to handle reading segments out of order in which they are written.

Figure 4:
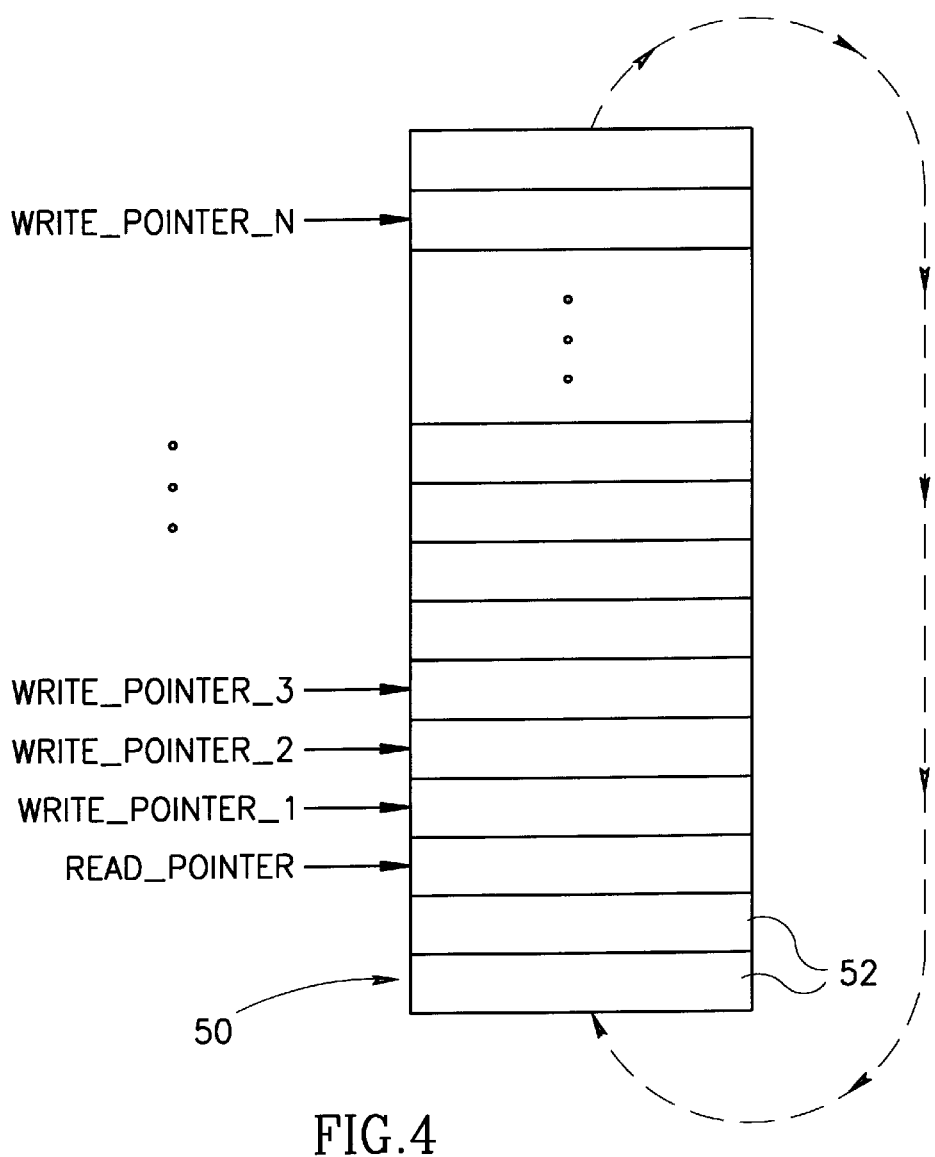
FIG. 4 is a block diagram illustrating an example FIFO queue implemented as a circular buffer.
Figure 5:
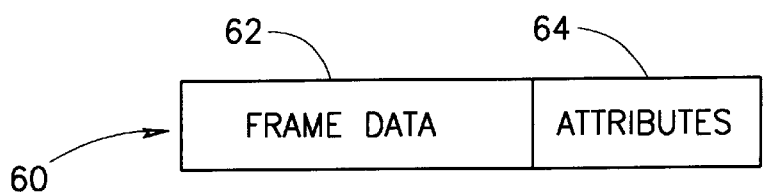
FIG. 5 is a diagram illustrating the format of an entry in the FIFO.

A block diagram illustrating an example FIFO queue implemented as a circular buffer is shown in FIG. 4. The memory portion shown in FIG. 4 represents the RAM making up the input queue 36 and the output queue 32. The RAM comprises a plurality of containers or segments 52 for holding the input frame data and the associated attributes. A diagram illustrating the format of an entry in the FIFO is shown in FIG. 5. The composition of a single segment 60 is shown comprising a frame data portion 62 and an attributes portion 64.

With reference to FIG. 4, the data input from an external port by the port combiner is placed into the input queue 36. The frame data is written to the next available segment within the RAM. Thus, the very first frame is written to the segment pointed to by WRITE_POINTER_1. Before the first segment of RAM is written to, the READ_POINTER does not point to a valid segment as there is as yet no data to read out. Once the writing of the data to the first segment is complete, the READ_POINTER is set to point to the same segment pointed to by the WRITE_POINTER_1. After the first segment is written to, the write pointer is incremented and set to point to the next available segment. Similarly, once the segment is read, the READ_POINTER is incremented so as to point to the next segment to be read out to the switching fabric 42.

In this fashion, the data from the input ports is written into segments in the RAM 50. The data is written to the RAM in circular fashion, in that once the top of the RAM is reached, the segment at the bottom of the RAM is written to next. The RAM is read in a similarly circular fashion.

The size of the RAM used to form the input and output queues is preferably large enough to handle worst case scenarios. For example, assuming a RAM size of 512 KB, with each segment allocated 2 KB, yields an input queue having 256 bins or segments for holding input frame data. Further, assuming that the first external port receives the maximum frame size of 1500 bytes and the other three external ports receive minimal frame sizes of 64 bytes. The speed of the ports is 100 Mbps each with a combined bandwidth of 400 Mbps for all four ports. In this scenario, the controller will wait for the 1500 frame to finish writing before reading out any data from the input queue. Thus, by the time the 1500 byte frame has finished, another 23 segments have been written to and are ready to be read out. Thus, a RAM size of 256 segments is sufficient in this case to support a worst case scenario.

The scanning method of the present invention functions to collapse a plurality of queues, each associated with one external port, into one unified queue. This technique results in dynamic and intelligent allocation of a shared resource, i.e., the switching fabric, to the plurality of external ports, including the bandwidth of the switching fabric and the associated buffers. Using the method and apparatus of the present invention, only the active external ports gain access to the shared resource and in a fair round robin fashion. The first frame received by the port combiner is the first frame to get serviced by the switching fabric, regardless of the external port on which the frame came in on. In addition, the RAM making up the input and output queues is utilized by the external ports that need them, with each external port allotted the exact share of the resources it needs.

While the invention has been described with respect to a limited number of embodiments, it will be appreciated that many variations, modifications and other applications of the invention may be made.

What is claimed is:

1. A method of allocating a shared resource among a plurality of ports, said method comprising the steps of:
   providing an input queue, said input queue divided into a plurality of segments wherein each segment is capable of holding a frame of data;
   scanning said plurality of ports in a predetermined manner for ports with a complete frame ready to be processed by said shared resource, wherein ports without a complete frame ready to be processed are ignored;
   writing those frames ready simultaneously to next available segments in said input queue, wherein the order of writing frames to said segments is in accordance with their arrival over said plurality of ports; and
   forwarding frame data sequentially from said input queue to said shared resource wherein the order of forwarding frames is the same order in which they were previously written to said input queue.

2. The method according to claim 1, wherein said step of writing comprises the step of maintaining a plurality of write pointers wherein each write pointer points to a segment of said input queue holding frame data.

3. The method according to claim 1, wherein said step of writing comprises the step of maintaining a write pointer which points to the next free segment within said input queue to be written to with frame data from an external port.

4. The method according to claim 1, wherein said step of reading comprises the step of maintaining a single read pointer which points to the next segment of frame data to be read to said shared resource.

5. The method according to claim 1, wherein said steps of scanning, writing and reading are performed sufficiently quick enough to allocate the shared resource in the case when the bandwidth of the shared resource is less than the aggregate bandwidth of said plurality of external ports.

6. The method according to claim 1, further comprising the step of queuing the frame data input from each external port before being written to said input queue.

7. The method according to claim 1, wherein said shared resource comprises a switching fabric.

8. The method according to claim 1, wherein frame data from said plurality of external ports is written to the next free segment in said input queue without regard to the particular external port the frame originated on.

9. The method according to claim 1, wherein said step of scanning comprises scanning said plurality of external ports in a round robin fashion.

10. Apparatus for allocating a shared resource among a plurality of ports, said apparatus comprising:

an input queue, said input queue divided into a plurality of segments wherein each segment is capable of holding a frame of data;

scanning means for scanning said plurality of ports in a predetermined manner for a port with a complete frame ready to be processed by said shared resource, wherein ports without a complete frame ready to be processed are ignored;

write means for writing those frames ready simultaneously to next available segments in said input queue, wherein the order of writing frames to said segments is in accordance with their arrival over said plurality of ports; and forwarding means for forwarding frame data sequentially from said input queue to said shared resource wherein the order of forwarding frames is the same order in which they were previously written to said input queue.

11. The apparatus according to claim 10, wherein said write means comprises means for maintaining a plurality of write pointers wherein each write pointer points to a segment of said input queue holding frame data.

12. The apparatus according to claim 10, wherein said write means comprises means for maintaining a write pointer which points to the next free segment within said input queue to be written to with frame data from an external port.

13. The apparatus according to claim 10, wherein said read means comprises means for maintaining a single read pointer which points to the next segment of frame data to be read to said shared resource.

14. The apparatus according to claim 10, wherein said scanning means, said write means and said read means are adapted to allocate the shared resource with sufficient speed to accommodate the case when the bandwidth of the shared resource is less than the aggregate bandwidth of said plurality of external ports.

15. The apparatus according to claim 10, wherein said shared resource comprises a switching fabric.

16. The apparatus according to claim 10, wherein said write means is adapted to write frame data from said plurality of external ports to the next free segment in said input queue without regard to the particular external port the frame originated on.

17. The apparatus according to claim 10, wherein said scanning means comprises means for scanning said plurality of external ports in a round robin fashion.

18. The apparatus according to claim 10, further comprising an output queue for receiving data from said shared resource directed to said plurality of external ports.

19. The apparatus according to claim 10, wherein said input queue comprises random access memory (RAM) configured as a circular buffer thus creating a first in first out (FIFO) queue.

20. The apparatus according to claim 10, further comprising an input buffer for performing rate adaptation between said input queue and said shared resource.

21. The apparatus according to claim 18, further comprising an output buffer for performing rate adaptation between said output queue and said shared resource.

22. A multiple input, single output queue, comprising:

a memory buffer containing a plurality of segment locations, said memory buffer adapted to support the simultaneous writing of frame data from a plurality of ports;

a scanning mechanism for detecting ports with frame data ready to be processed; and a controller, said controller operative to: and wherein frames from a plurality of ports may be written simultaneously to said memory buffer;

retrieve frames from said memory buffer and output them to said shared resource, wherein the order in which frames are retrieved from said memory buffer is the same order in which they were previously stored in said memory buffer.

23. The queue according to claim 22, wherein said controller is adapted to pass frames to said shared resource without regard to the particular port they arrived on.

24. The queue according to claim 22, wherein said scanning mechanism is operative to ignore ports that do not have a frame ready to be processed.

25. The queue according to claim 22, wherein said memory buffer is adapted to support a number of simultaneous write operation at least equal to the number of ports to be supported by said queue.

* * * * *